(12) United States Patent
Feng et al.

(10) Patent No.: US 11,942,888 B2
(45) Date of Patent: Mar. 26, 2024

(54) POWER TOOL

(71) Applicant: Nanjing Chervon Industry Co., Ltd., Nanjing (CN)

(72) Inventors: Jifeng Feng, Nanjing (CN); Chao Xian, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 178 days.

(21) Appl. No.: 17/722,620

(22) Filed: Apr. 18, 2022

(65) Prior Publication Data
US 2022/0360209 A1 Nov. 10, 2022

(30) Foreign Application Priority Data
May 7, 2021 (CN) .......................... 202110495553.9

(51) Int. Cl.
*H02P 29/60* (2016.01)
*E01H 5/09* (2006.01)

(52) U.S. Cl.
CPC ............. *H02P 29/60* (2016.02); *E01H 5/098* (2013.01)

(58) Field of Classification Search
CPC .......... H02P 29/60; H02P 25/04; H02P 7/282; H02P 7/298; H02P 21/26; H02P 21/28; E01H 5/098; G06F 11/3058; G11B 33/144; H04N 21/42202; H05B 47/105; H05B 47/115; H05B 4/125; H05B 47/13; H05B 47/135; H05B 47/14
USPC ..................... 318/472, 795, 817, 400.08, 641
See application file for complete search history.

(56) References Cited

U.S. PATENT DOCUMENTS 9,698,712 B2 7/2017 Nagata et al.
2016/0303948 A1* 10/2016 Sakai .................... B60L 15/007

FOREIGN PATENT DOCUMENTS

| DE | 112018005357 T5 | 6/2020 |
| EP | 3687075 A1 | 7/2020 |
| JP | 04208873 A | 7/1992 |
| JP | 2017143647 A | 8/2017 |

OTHER PUBLICATIONS

Okimoto et al. (WO 2019098004 A1) Power Conversion Device Date Published May 23, 2019 (Year: 2019).*
Xu et al. (CN 112600481 A) A Single-phase Motor Control Device For Security Inspection Machine Date Published Apr. 2, 2021 (Year: 2021).*

* cited by examiner

Primary Examiner — Jorge L Carrasquillo
(74) Attorney, Agent, or Firm — Greenberg Traurig, LLP

(57) ABSTRACT

A power tool includes a power a motor, a driver circuit, a capacitor, a capacitor switch, a temperature detection unit, and a controller. The capacitor is configured to filter out current spikes in a power supply. The capacitor switch is configured to control a working state of the capacitor. The temperature detection unit is configured to detect a temperature of a related object. The controller is configured to: acquire the temperature of the related object; control the capacitor switch to be in a first on or off state such that the capacitor works in a first working state when the temperature is lower than a temperature threshold; and control the capacitor switch to be in a second on or off state such that the capacitor works in a second working state when the temperature is higher than the temperature threshold.

17 Claims, 6 Drawing Sheets

POWER TOOL

RELATED APPLICATION INFORMATION

This application claims the benefit under 35 U.S.C. § 119(a) of Chinese Patent Application No. CN 202110495553.9, filed on May 7, 2021, which application is incorporated herein by reference in its entirety.

BACKGROUND

Power tools such as snow throwers are used in a particular season. A snow thrower is typically provided with a corresponding hardware facility such as a low-temperature capacitor according to the environmental characteristic of a low temperature in winter, so as to work normally. However, most power tools are used in more than one season. For example, a lawn mower may be used in all seasons. Generally, such power tools are not provided with an adaptive configuration for a particular season in which they work, such as a cold winter. As a result, such power tools may have unstable working performance under special environmental conditions. For example, the lawn mower is generally provided with a normal-temperature capacitor whose capacity significantly decays when an ambient temperature is very low, seriously affecting a filtering effect of the capacitor and the normal working of the power tool at a low temperature.

SUMMARY

A power tool includes a power interface, a motor, a driver circuit, a capacitor, a capacitor switch, a temperature detection unit, and a controller. The power interface is configured to be connected to a power supply. The motor is configured to power the power tool. The driver circuit has multiple switching elements for switching an energized state of the motor. The capacitor is configured to filter out current spikes in the power supply. The capacitor switch is connected to the capacitor and configured to control a working state of the capacitor. The temperature detection unit is configured to detect a temperature of a related object, where the related object includes a working environment in which the power tool is located and/or the capacitor and/or the motor. The controller is electrically connected to at least the capacitor switch and configured to control an on or off state of the capacitor switch. The controller is configured to: acquire the temperature of the related object; in response to the temperature being lower than a temperature threshold, control the capacitor switch to be in a first on or off state such that the capacitor works in a first working state; and in response to the temperature being higher than the temperature threshold, control the capacitor switch to be in a second on or off state such that the capacitor works in a second working state.

In one example, the capacitor in the first working state has a lowest effective use temperature lower than a lowest effective use temperature of the capacitor in the second working state.

In one example, the capacitor includes a first capacitor and a second capacitor. The capacitor switch includes a first switch. The first switch is connected to the first capacitor and configured to control an on or off state of the first capacitor.

In one example, the second capacitor is in a working state. The controller is configured to, in response to the temperature being lower than the temperature threshold, control the first switch to be turned on such that the first capacitor is in the working state.

In one example, the capacitor switch further includes a second switch. The second switch is connected to the second capacitor and configured to control an on or off state of the second capacitor. The controller is configured to: in response to the temperature being lower than the temperature threshold, control the first switch to be turned on such that the first capacitor is in the working state and the second switch to be turned off such that the second capacitor is in a non-working state; and in response to the temperature being higher than the temperature threshold, control the first switch to be turned off such that the first capacitor is in the non-working state and control the second switch to be turned on such that the second capacitor is in the working state.

In one example, the first capacitor has a lowest effective use temperature lower than a lowest effective use temperature of the second capacitor.

In one example, the capacitor is a first capacitor.

In one example, the capacitor switch includes a third switch and a fourth switch. The third switch is connected between the power supply and the capacitor and configured to control a charging state of the capacitor. The fourth switch is connected in parallel to the capacitor and configured to control a discharging state of the capacitor.

In one example, the controller is configured to, in response to the temperature being lower than the temperature threshold, control the third switch and the fourth switch to be in complementary on or off states at a certain frequency, where the complementary on or off states refer to that the fourth switch is turned off while the third switch is turned on and that the fourth switch is turned on while the third switch is turned off.

In one example, the controller is configured to, in response to the temperature being higher than the temperature threshold, control the third switch to be turned on and the fourth switch to be turned off.

In one example, the temperature threshold is a specific temperature value.

In one example, the temperature threshold is a temperature threshold range including a lowest temperature and a highest temperature.

In one example, the controller is configured to: in response to the temperature being lower than the lowest temperature, control the capacitor switch to be in the first on or off state such that the capacitor works in the first working state; and in response to the temperature being higher than the highest temperature, control the capacitor switch to be in the second on or off state such that the capacitor works in the second working state.

In one example, the first capacitor works within a temperature range of −55° C. to 85° C.

In one example, the second capacitor works within a temperature range of −40° C. to 105° C.

A power tool includes a power interface, a motor, a driver circuit, at least one capacitor, at least one capacitor switch, a temperature detection unit, and a controller. The power interface is configured to be connected to a power supply. The motor is configured to power the power tool. The driver circuit has multiple switching elements for switching an energized state of the motor. The at least one capacitor is configured to filter out current spikes in the power supply. The at least one capacitor switch is connected to the capacitor and configured to control a working state of the at least one capacitor. The temperature detection unit is configured to detect a temperature of a related object, where the related object includes a working environment in which the power tool is located and/or the at least one capacitor and/or the motor. The controller is electrically connected to at least the at least one capacitor switch and configured to control an on or off state of the at least one capacitor switch. The controller is configured to: acquire the temperature of the related object; in response to the temperature being lower than a temperature threshold, control the at least one capacitor switch to be in a first on or off state such that the at least one capacitor works in a first working state; and in response to the temperature being higher than the temperature threshold, control the at least one capacitor switch to be in a second on or off state such that the at least one capacitor works in a second working state.

A power tool includes a power interface, a motor, a driver circuit, a capacitor, a capacitor switch, a temperature detection unit, and a controller. The power interface is configured to be connected to a power supply. The motor is configured to power the power tool. The driver circuit has multiple switching elements for switching an energized state of the motor. The capacitor is configured to filter out current spikes in the power supply. The capacitor switch is connected to the capacitor and configured to control a working state of the capacitor. The temperature detection unit is configured to detect a temperature of a related object, where the related object includes a working environment in which the power tool is located and/or the capacitor and/or the motor. The controller is electrically connected to at least the capacitor switch and configured to control an on or off state of the capacitor switch. The capacitor switch includes a third switch and a fourth switch. The third switch is connected between the power supply and the capacitor and configured to control a charging state of the capacitor. The fourth switch is connected in parallel to the capacitor and configured to control a discharging state of the capacitor. The controller is configured to: acquire the temperature of the related object; and in response to the temperature being lower than a temperature threshold, control the third switch and the fourth switch to be in complementary on or off states at a certain frequency, where the complementary on or off states refer to that the fourth switch is turned off while the third switch is turned on and that the fourth switch is turned on while the third switch is turned off.

In one example, the controller is configured to, in response to the temperature being higher than the temperature threshold, control the third switch to be turned on and the fourth switch to be turned off.

In one example, the temperature threshold is a specific temperature value or a temperature threshold range including a lowest temperature and a highest temperature.

In one example, the controller is configured to: in response to the temperature being lower than the lowest temperature, control the third switch and the fourth switch to be in the complementary on or off states at the certain frequency, where the complementary on or off states refer to that the fourth switch is turned off while the third switch is turned on and that the fourth switch is turned on while the third switch is turned off; and in response to the temperature being higher than the highest temperature, control the third switch to be turned on and the fourth switch to be turned off.

DETAILED DESCRIPTION

Figure 1:
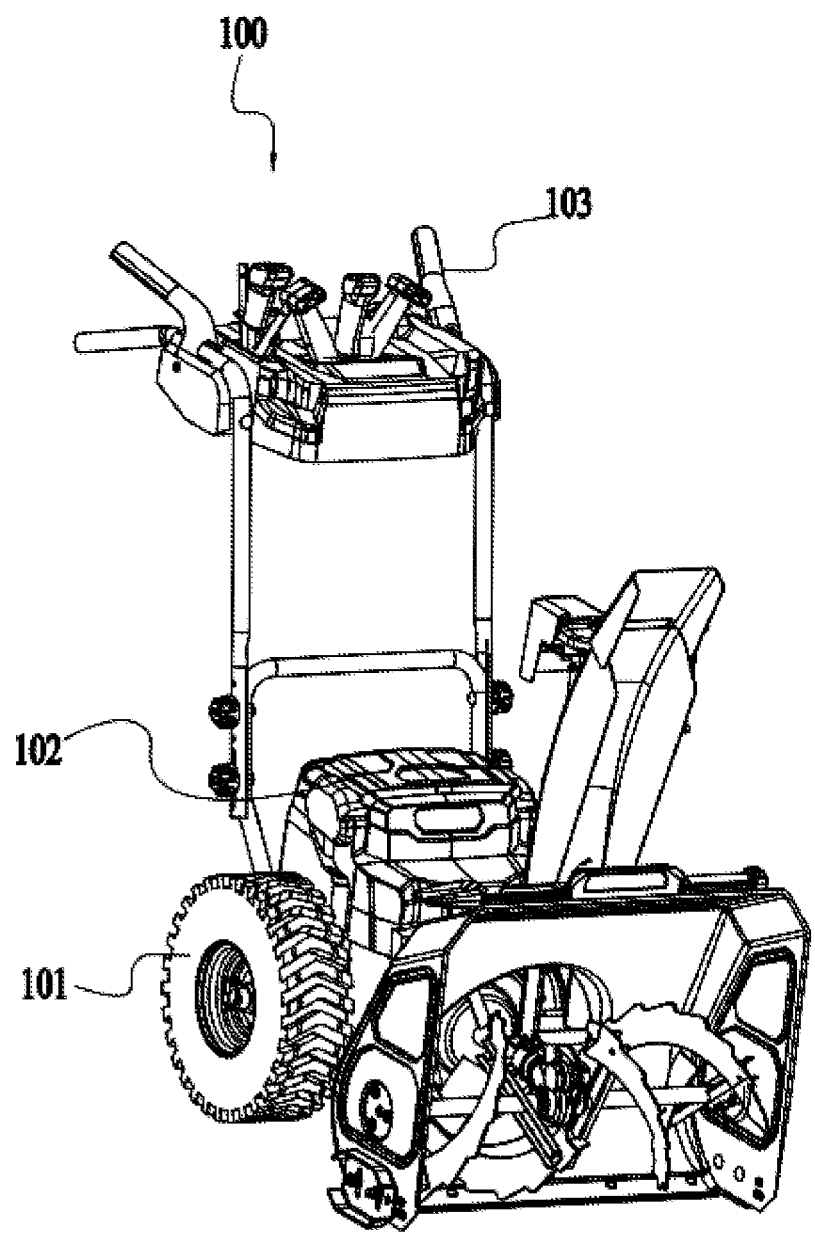
FIG. 1 is a structure view of a power tool according to an example of the present disclosure.

The present disclosure is described below in detail in conjunction with drawings and examples. It is to be understood that the examples described herein are intended to illustrate and not to limit the present disclosure. Additionally, it is to be noted that for ease of description, merely part, not all, of the structures related to the present disclosure are illustrated in the drawings.

It is to be noted that a capacitor control method in the present application is applicable to multiple types of power tools such as a lawn mower, a riding lawn mower, and a snow thrower. The snow thrower is used as an example for illustration. Referring to FIG. 1, a power tool 100 includes walking wheels 101, a main body 102, and a handle device 103. An operation member is disposed on the handle device 103 and configured to control the snow thrower to walk. The handle device 103 is detachably connected to the main body 102.

Figure 2:
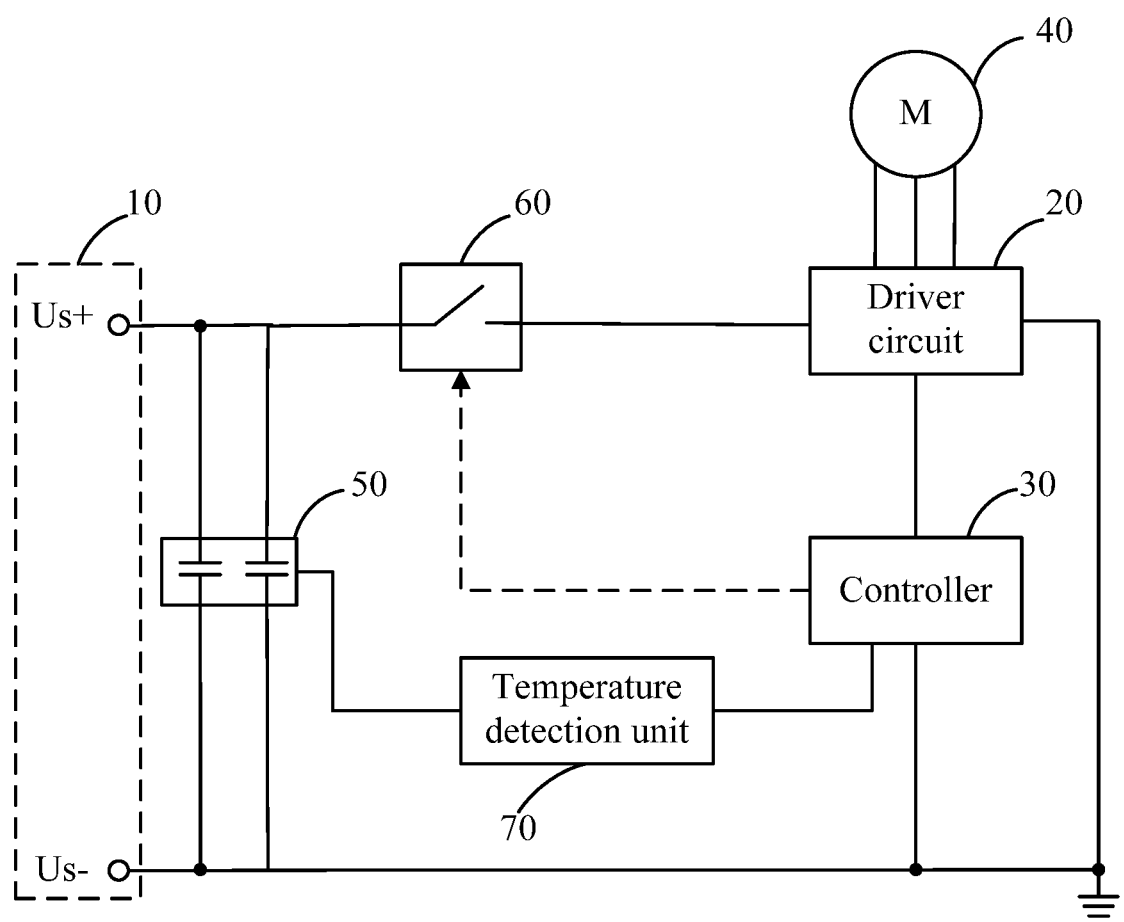
FIG. 2 is a circuit schematic of a power tool in an example.

Referring to FIG. 2 which is a circuit diagram of the power tool, a power interface 10, a driver circuit 20, a controller 30, a motor 40, a capacitor 50, a capacitor switch 60, and a temperature detection unit 70 may be included.

The power interface 10 is configured to be connected to a power supply so as to supply electricity to the power tool. In an example, the power supply connected to the power interface may be alternating current mains. In an example, the power supply connected to the power interface 10 may also be a battery pack. The battery pack may be composed of a group of battery units. For example, the battery units may be connected in series as a single power supply branch to form a 1P battery pack. Of course, the battery pack may be composed of two or more groups of battery units.

The driver circuit 20 is connected between the controller 30 and the motor 40 and has multiple semiconductor switching elements for switching an energized state of the motor. The type of the motor 40 is not limited in the present application. In an example, the driver circuit 20 is electrically connected to a stator winding of each phase of the motor 40 so as to transfer a current of the power supply to the stator winding to drive the motor to rotate. In an example, the driver circuit 20 may include multiple switching elements. Each gate terminal of the switching elements is electrically connected to the controller 30 and configured to receive a control signal from the controller 30. Each drain or source of the switching elements is connected to the stator winding of the motor 40. Each of the switching elements receives the control signal from the controller 30 to change a respective on or off state, thereby changing a current applied by the power supply to the stator winding of the motor 40. In an example, the switching elements in the driver circuit 20 may be a three-phase bridge driver circuit which includes six controllable semiconductor power devices (for example, field-effect transistors (FETs), bipolar junction transistors (BJTs), insulated-gate bipolar transistors (IGBTs), or the like) or any other type of solid state switch, for example, an IGBT, a BJT, or the like.

To rotate the motor 40, the driver circuit 20 has multiple driving states. In one driving state, the stator winding of the motor 40 generates one magnetic field. The controller 30 outputs a corresponding control signal to the switching element in the driver circuit 20 according to a rotor position or a counter-electromotive force of the motor such that the driver circuit 20 switches a driving state. Therefore, the stator winding generates a changing magnetic field to drive a rotor to rotate, implementing the rotation or commutation of the motor 40. It is to be noted that any other circuit and control manner which can drive the motor 40 to rotate or commutate may be used in the present disclosure. A circuit structure of the driver circuit 20 and the control of the driver circuit 20 by the controller 30 are not limited in the present disclosure.

The capacitor 50 can filter out current spikes in the power supply to avoid an impact on the motor and prevent the working performance of the tool from being affected. In the present application, the capacitor 50 may be an electrolytic capacitor or an ordinary capacitor. Since a low-temperature capacitor has a small decay in capacity at a very low temperature, the low-temperature capacitor can work normally at a low temperature. However, a normal-temperature capacitor has a large decay in capacity at a very low temperature, thereby affecting the performance of a control system. In general, only a specific power tool used in winter (such as a snow thrower) uses the low-temperature capacitor, and a general power tool used in all seasons uses only the normal-temperature capacitor. Therefore, for a power tool (such as the lawn mower) used at a normal temperature and sometimes used at a low temperature, the performance of the control system may be affected because a capacitor in a control circuit has a rapid decay in capacity at a low temperature. For example, the motor cannot be started or cannot work normally after being started.

The capacitor switch 60 is connected to the capacitor 50 and configured to control a working state of the capacitor. Optionally, the capacitor switch 60 may be a controllable semiconductor power device such as a FET, a BJT, or an IGBT or any other type of solid state switch such as the IGBT or the BJT.

The temperature detection unit 70 is configured to detect a temperature of a related object and transmit the temperature to the controller 30 so that the controller 30 can control an on or off state of the capacitor switch 60 accordingly. In an example, the related object may be the capacitor, the motor, or a working environment in which the tool is currently located. That is, the temperature detection unit may detect a temperature of the capacitor, a temperature of the motor, or a temperature of the working environment of the tool or may simultaneously detect the temperatures of one or more of the capacitor, the motor, or the working environment of the tool. In the present application, the temperature detection unit 70 may be a patch sensor such as a chip resistor which is attached to the capacitor and configured to detect the temperature or may be any other component capable of detecting the temperature.

In the present application, the temperature detection unit 70 is disposed so that the working state of the capacitor 50 is controlled in conjunction with the capacitor switch 60, which can prevent the working performance of the capacitor from being affected at the low temperature. In a specific implementation, the controller 30 may acquire the temperature of the capacitor detected by the temperature detection unit 70. When the temperature is lower than a temperature threshold, the controller 30 controls the capacitor switch to be in a first on or off state such that the capacitor works in a first working state. When the preceding temperature is higher than the temperature threshold, the controller 30 controls the capacitor switch to be in a second on or off state such that the capacitor works in a second working state. For example, the preceding temperature threshold may be a specific temperature value such as −30° C. or may be a temperature range such as a range between −25° C. and −35° C. If the temperature threshold is the temperature range, the controller 30 may control the capacitor switch 60 to be in the first on or off state when the detected temperature is lower than a minimum value in the temperature range and control the capacitor switch 60 to be in the second on or off state when the temperature is higher than a maximum value in the temperature range. It is to be understood that the magnitude or range of the preceding temperature threshold may be defined according to actual requirements. It is to be noted that the first working state of the capacitor 50 is a working state at the low temperature, and the second working state of the capacitor 50 is a working state at the normal temperature. No absolute boundary exists for defining the preceding normal and low temperatures. For example, the normal temperature may be from −40° C. to 105° C., and the low temperature may be from −55° C. to 85° C. That is, the lowest temperature of the normal temperature is higher than the lowest temperature of the low temperature, and the highest temperature of the normal temperature is higher than the highest temperature of the low temperature. The normal temperature and the low temperature herein are defined according to an ambient temperature that can be accepted by the capacitor that works normally and are not defined in a normal sense. It is to be noted that a lowest effective use temperature of the capacitor 50 in the first working state is lower than a lowest effective use temperature of the capacitor 50 in the second working state.

In an example, the capacitor switch is controlled such that the capacitor has different working states to adapt to a change from a high temperature to the low temperature. Thus, the power tool is provided which is free from an effect of the ambient temperature and has stable working performance.

Figure 3:
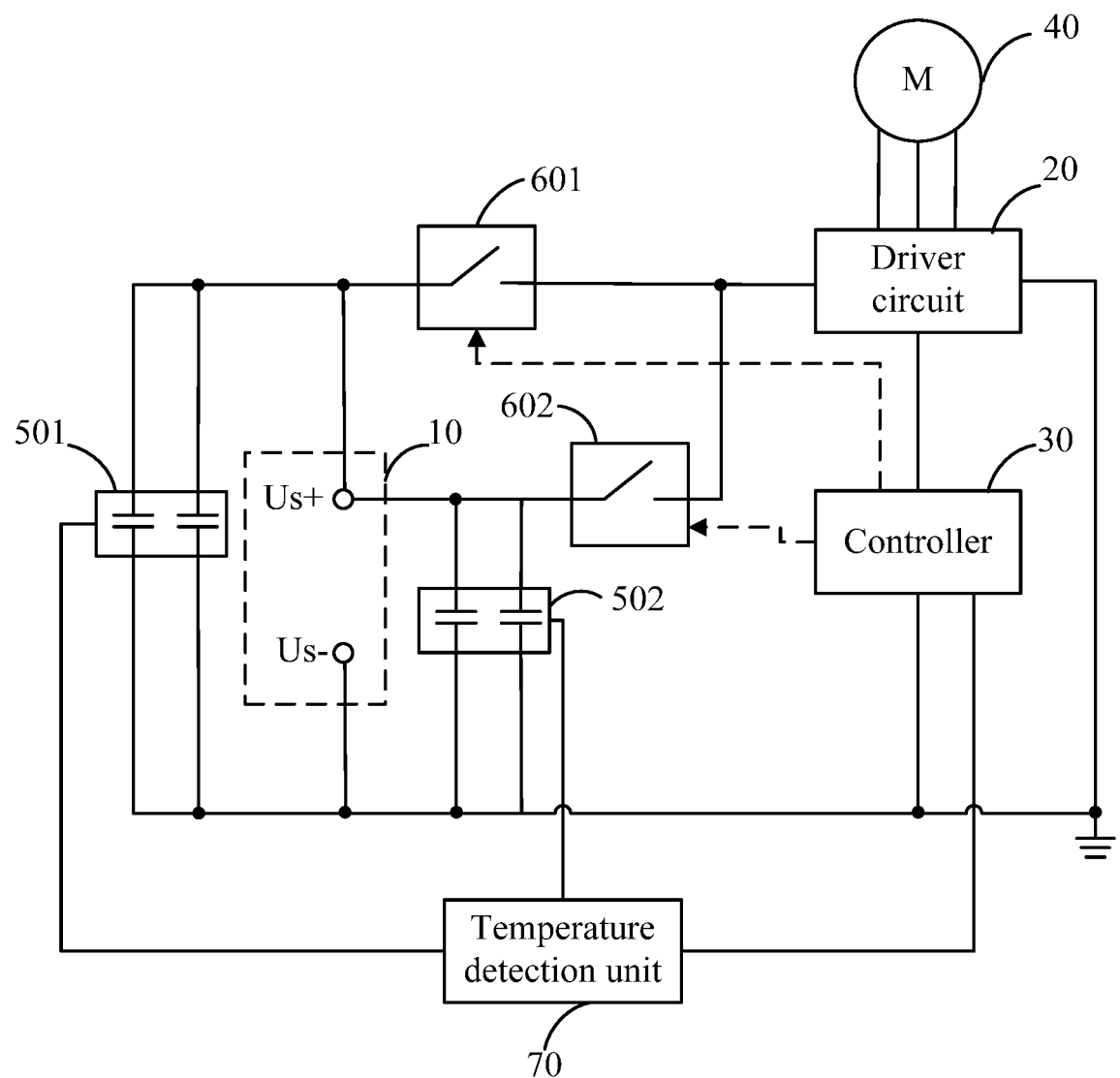
FIG. 3 is another circuit schematic of a power tool in an example.

In an example, as shown in FIG. 3, the capacitor 50 includes a first capacitor 501 and a second capacitor 502. The first capacitor 501 is connected to a first switch 601, and the second capacitor 502 is connected to a second switch 602. That is, working states of the two capacitors are controlled by two switches, respectively. In this example, when the detected temperature is lower than the temperature threshold, the controller 30 controls the first switch 601 to be turned on such that the first capacitor 501 is in a working state and controls the second switch 602 to be turned off such that the second capacitor 502 is in a non-working state. When the temperature is higher than the temperature threshold, the first switch 601 is turned off such that the first capacitor 501 is in the non-working state and the second switch 602 is turned on such that the second capacitor 502 is in the working state. It is to be noted that the first capacitor 501 is the low-temperature capacitor, can work at the low temperature, and will not have a large decay in capacity even if the ambient temperature is very low so that the working performance of the tool is not affected; the second capacitor 502 is the normal-temperature capacitor, can work normally at the normal temperature, and will be affected by the low temperature to greatly decay in capacity so that the performance of the tool is affected. It is to be understood that in a circuit shown in FIG. 3, the temperature detection unit 70 can simultaneously detect the temperature of the first capacitor 501 and the temperature of the second capacitor 502, and the controller 30 controls the working state of the first capacitor 501 according to the temperature of the first capacitor 501 and controls the working state of the second capacitor 502 according to the temperature of the second capacitor 502; alternatively, the controller 30 may control the working states of the two capacitors separately by integrating the temperatures of the two capacitors. Alternatively, two temperature acquisition modules may be used to collect the temperatures of the two capacitors respectively and transmit the temperatures to the controller.

In this example, the low-temperature capacitor and a high-temperature capacitor and corresponding control switches are respectively disposed, and a capacitor to be switched to is selected according to the temperature of the capacitor so that the tool adaptively adjusts the capacitors in a simple and direct control manner when working at different temperatures, ensuring the stable working performance of the tool.

Figure 4:
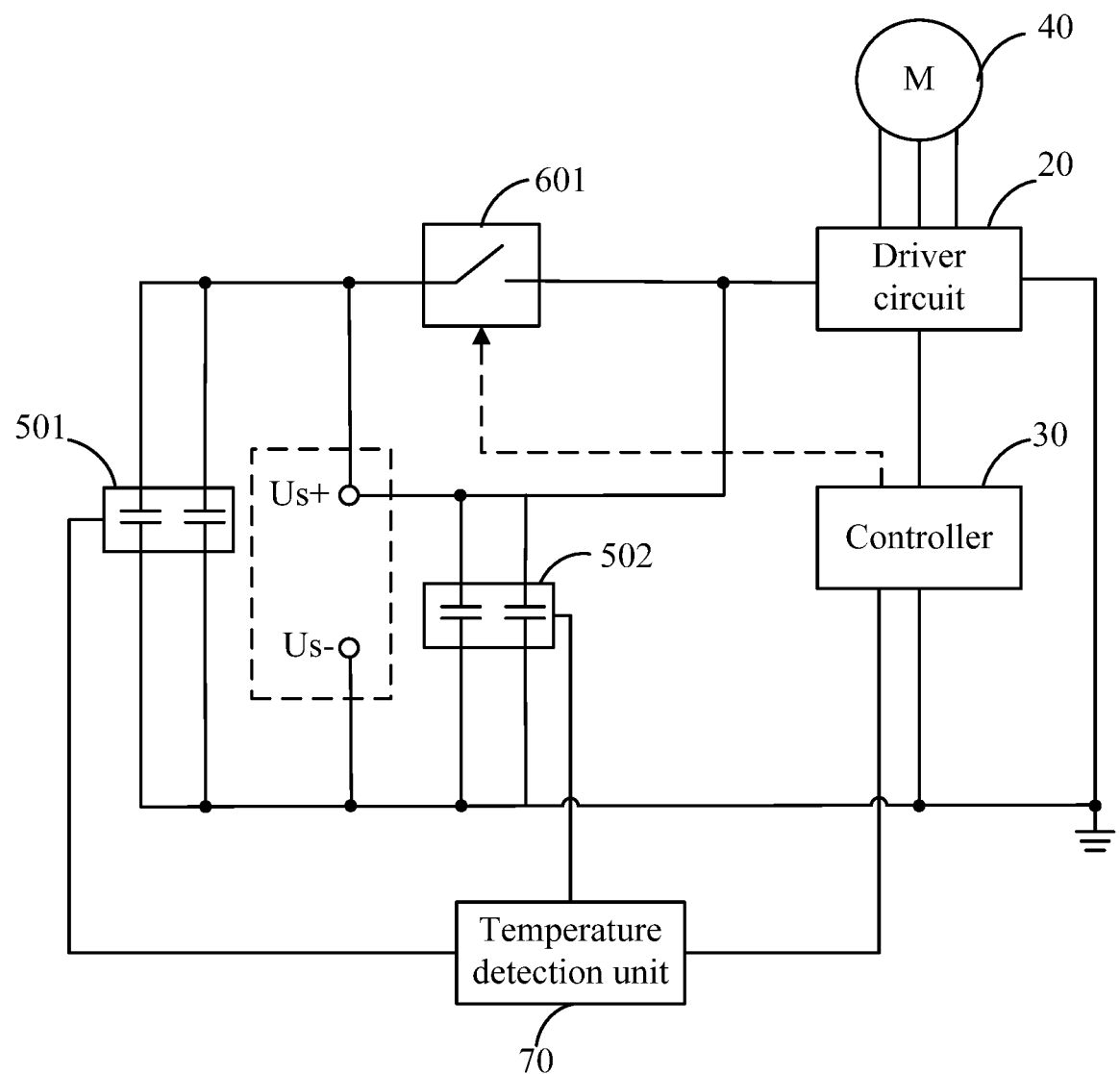
FIG. 4 is another circuit schematic of a power tool in an example.

In an example, a control circuit shown in FIG. 4 is different from the control circuit shown in FIG. 3 in that the second switch 602 does not exist. That is, the second capacitor 502 is always in the working state no matter what the current temperature is. In a specific implementation, when the detected temperature is lower than the temperature threshold, the controller 30 controls the first switch 601 to be turned on such that the first capacitor 501 is in the working state. In this example, the second capacitor 502, which is the normal-temperature capacitor, is configured to be in the working state; and merely the working state of the low-temperature capacitor, the first capacitor 501, is controlled. On the basis that the original circuit is changed as little as possible, the capacitor to be switched to can be selected according to the temperature of the capacitor by simply adding the second capacitor and the control switch so that the tool adaptively adjusts the capacitors when working at different temperatures, ensuring the stable working performance of the tool.

Figure 5:
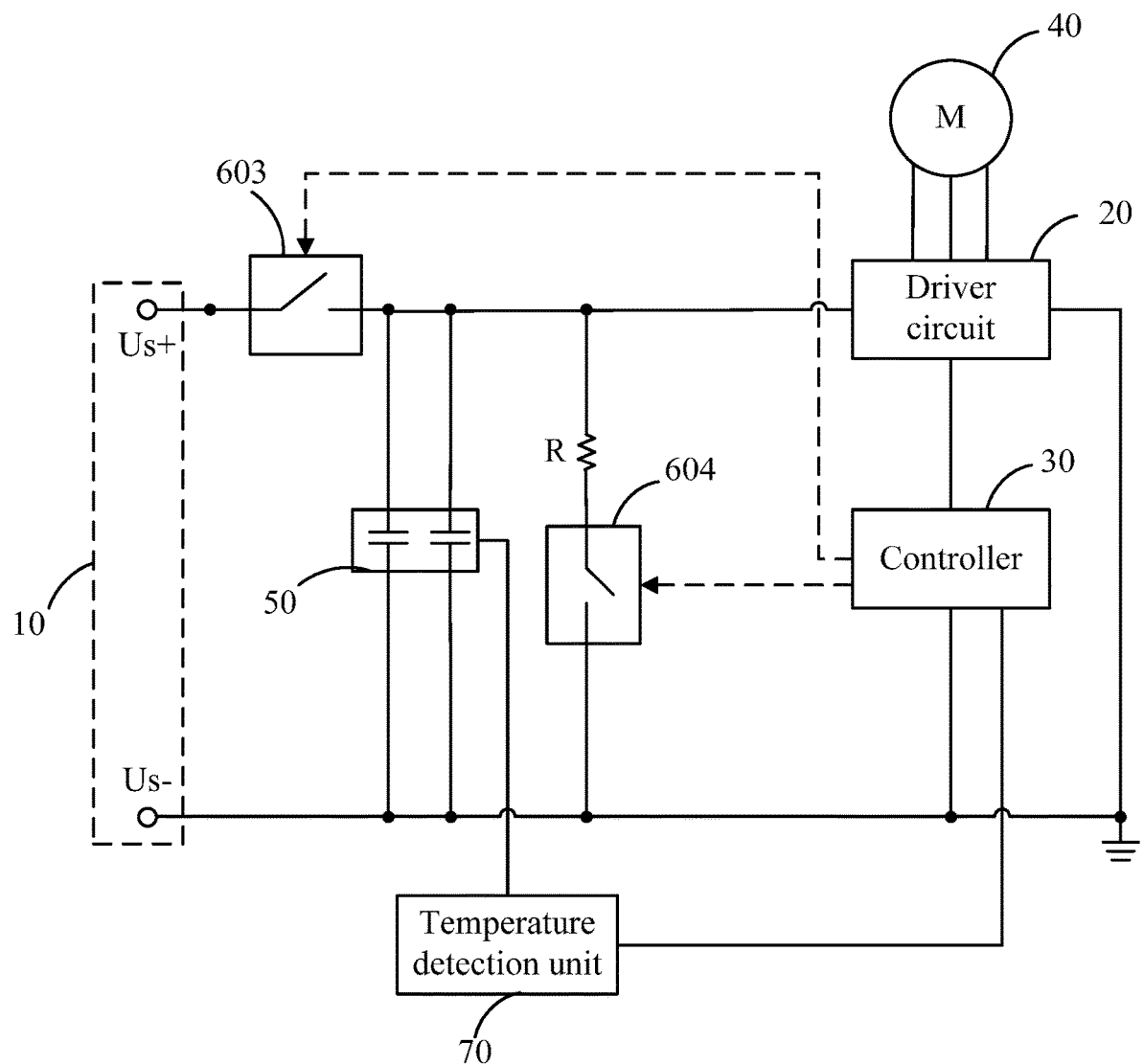
FIG. 5 is another circuit schematic of a power tool in an example.

In an example of the present application, no additional capacitor is required, and the capacitor can be controlled by the control circuit shown in FIG. 5 to adapt to a change between different temperatures so that the power tool adapts to a change of the ambient temperature. Specifically, the capacitor switch 60 includes a third switch 603 and a fourth switch 604; the third switch 603 is connected between the power supply and the capacitor 50 and configured to control a charging state of the capacitor; and the fourth switch 604 is connected in parallel to the capacitor 50 and is configured to control a discharging state of the capacitor 50. In a specific implementation, when the detected temperature is lower than the temperature threshold, the controller 30 may control the third switch 603 and the fourth switch 604 to be in complementary on or off states at a certain frequency. The so-called complementary on or off states refer to that the fourth switch 604 is turned off while the third switch 603 is turned on and that the third switch 603 is turned off while the fourth switch 604 is turned on. In the preceding manner, the capacitor can be charged and discharged at a certain frequency, thereby gradually increasing the temperature of the capacitor. Further, when the temperature of the capacitor is higher than the temperature threshold, the controller 30 controls the third switch 603 to be turned on and the fourth switch 604 to be turned off to make the capacitor work normally.

In this example, no additional capacitor is required and merely two control switches together with a simple control manner can increase the temperature of the capacitor itself, that is, an ambient temperature at which the capacitor works, thereby fundamentally avoiding a significant decrease in performance when the capacitor works at the low temperature and ensuring the stable working performance of the power tool.

In an example of the present application, the first capacitor has a lowest effective use temperature lower than a lowest effective use temperature of the second capacitor. The lowest effective use temperature refers to a lowest ambient temperature at which the capacitor works normally without a significant decay in capacity. That is, the low-temperature capacitor may work at a lower ambient temperature and maintain a relatively small decay in capacity. However, while maintaining a relatively small decay in capacity, the normal-temperature capacitor works at a temperature higher than the lowest temperature at which the low-temperature capacitor normally works.

Figure 6:
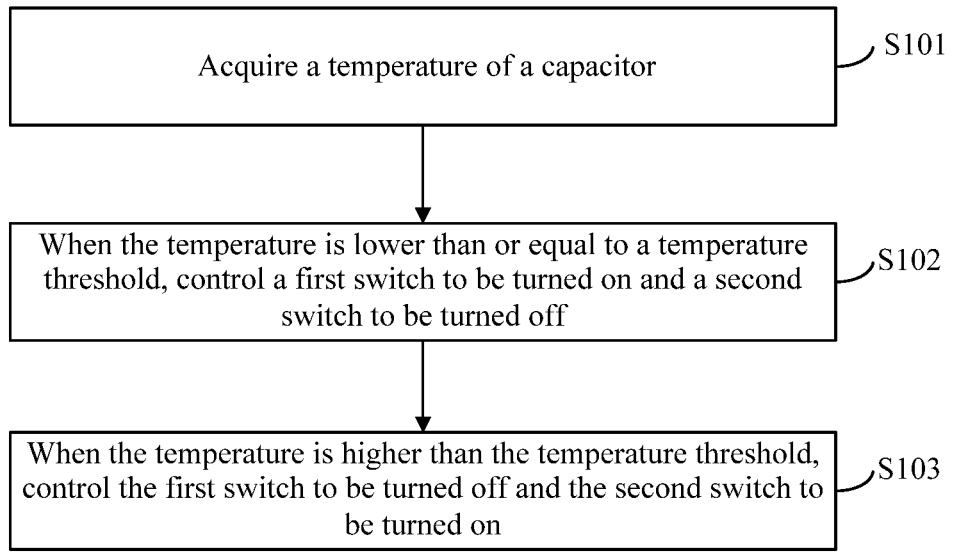
FIG. 6 is a control flowchart of a power tool in an example.

A control method of a power tool is described below in conjunction with FIG. 6. The method includes steps described below.

In S101, a temperature of a capacitor is acquired.

In this example, the preceding capacitor includes a first capacitor and a second capacitor, that is, a normal-temperature capacitor and a low-temperature capacitor. The first capacitor is connected to a first switch, the second capacitor is connected to a second switch, and the two switches are respectively configured to control working states of the corresponding capacitors. It is to be understood that when a switch is turned on, a capacitor connected to the switch is in a working state, and when the switch is turned off, the capacitor connected to the switch is in a non-working state.

In S102, when the temperature is lower than a temperature threshold, the first switch is controlled to be turned on and the second switch is controlled to be turned off.

In S103, when the temperature is higher than the temperature threshold, the first switch is controlled to be turned off and the second switch is controlled to be turned on.

Figure 7:
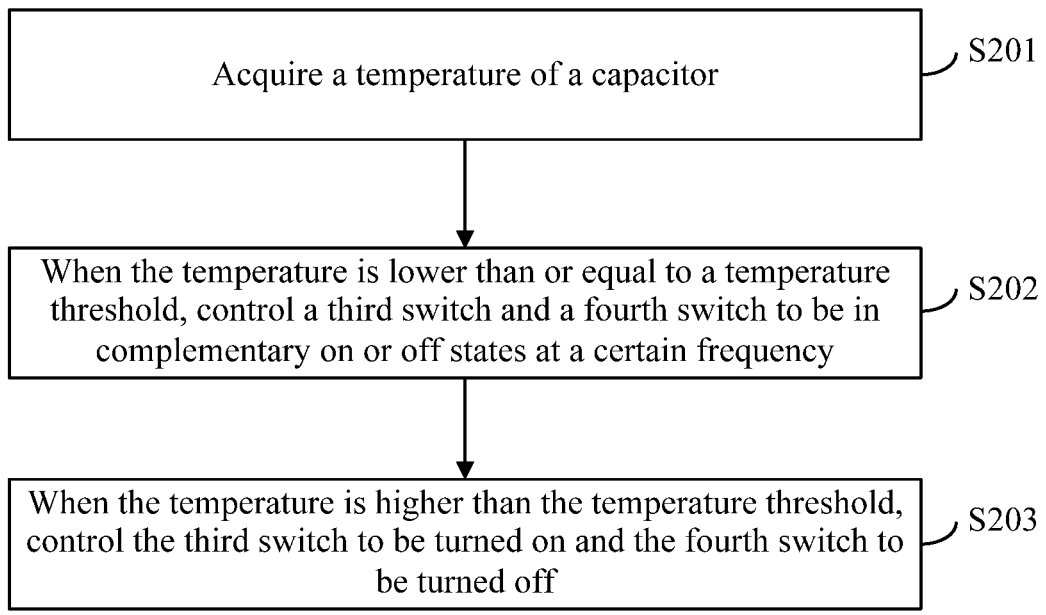
FIG. 7 is another control flowchart of a power tool in an example.

Another control method of a power tool is described below in conjunction with FIG. 7. The method includes steps described below.

In S201, a temperature of a capacitor is acquired.

In this example, the capacitor refers to merely a normal-temperature capacitor. However, the capacitor is connected to two control switches. That is, a third switch is connected between a power supply and the capacitor and configured to control a charging state of the capacitor; and a fourth switch is connected in parallel to the capacitor and configured to control a discharging state of the capacitor.

In S202, when the temperature is lower than a temperature threshold, the third switch and the fourth switch are controlled to be in complementary on or off states at a certain frequency. The complementary on or off states refer to that the fourth switch is turned off while the third switch is turned on and that the fourth switch is turned on while the third switch is turned off.

In S203, when the temperature is higher than the temperature threshold, the third switch is controlled to be turned on and the fourth switch is controlled to be turned off.

It is to be noted that the above are merely preferred examples of the present disclosure and the technical principles used therein. It should be understood by those skilled in the art that the present disclosure is not limited to the examples described herein. Those skilled in the art can make various apparent changes, adaptations, and substitutions without departing from the scope of the present disclosure. Therefore, although the present disclosure has been described in detail through the preceding examples, the present disclosure is not limited to the preceding examples and may include more other equivalent examples without departing from the concept of the present disclosure. The scope of the present disclosure is determined by the scope of the appended claim.

What is claimed is:

1. A power tool, comprising:
a power interface configured to be connected to a power supply;
a motor;
a driver circuit having a plurality of switching elements for driving the motor;
a capacitor configured to filter out current spikes in the power supply;
a capacitor switch connected to the capacitor and configured to control a working state of the capacitor, the capacitor comprises a first capacitor and a second capacitor, the capacitor switch comprises a first switch, and the first switch is connected to the first capacitor and configured to control an on or off state of the first capacitor, the capacitor switch further comprises a second switch, the second switch is connected to the second capacitor and configured to control an on or off state of the second capacitor;
a temperature detection unit configured to detect a temperature of a related object; and
a controller electrically connected to the capacitor switch and configured to control an on or off state of the capacitor switch,
wherein the controller is configured to:
acquire the temperature of the related object;
control the capacitor switch to be in a first on or off state such that the capacitor works in a first working state when the temperature is lower than a temperature threshold;
control the capacitor switch to be in a second on or off state such that the capacitor works in a second working state when the temperature is higher than the temperature threshold;
control the first switch to be turned on such that the first capacitor is in a working state and control the second switch to be turned off such that the second capacitor is in a non-working state when the temperature is lower than the temperature threshold; and
control the first switch to be turned off such that the first capacitor is in a non-working state and control the second switch to be turned on such that the second capacitor is in a working state when the temperature is higher than the temperature threshold.

2. The power tool according to claim 1, wherein the capacitor in the first working state has a lowest effective use temperature lower than a lowest effective use temperature of the capacitor in the second working state.

3. The power tool according to claim 1, wherein the second capacitor is in a working state and the controller is configured to control the first switch to be turned on such that the first capacitor is in a working state when the temperature is lower than the temperature threshold.

4. The power tool according to claim 1, wherein the first capacitor has a lowest effective use temperature lower than a lowest effective use temperature of the second capacitor.

5. The power tool according to claim 1, wherein the capacitor switch comprises a third switch and a fourth switch, the third switch is connected between the power supply and the capacitor and configured to control a charging state of the capacitor, and the fourth switch is connected in parallel to the capacitor and configured to control a discharging state of the capacitor.

6. The power tool according to claim 5, wherein the controller is configured to control the third switch and the fourth switch to be in complementary on or off states at a certain frequency when the temperature is lower than the temperature threshold and the complementary on or off states refer to that the fourth switch is turned off while the third switch is turned on and that the fourth switch is turned on while the third switch is turned off.

7. The power tool according to claim 6, wherein the controller is configured to control the third switch to be turned on and the fourth switch to be turned off when the temperature is higher than the temperature threshold.

8. The power tool according to claim 1, wherein the temperature threshold is a specific temperature value.

9. The power tool according to claim 1, wherein the temperature threshold is a temperature threshold range comprising a lowest temperature and a highest temperature.

10. The power tool according to claim 9, wherein the controller is configured to control the capacitor switch to be in the first on or off state such that the capacitor works in the first working state when the temperature is lower than the lowest temperature and control the capacitor switch to be in the second on or off state such that the capacitor works in the second working state when the temperature is higher than the highest temperature.

11. The power tool according to claim 1, wherein the first capacitor works within a temperature range of −55° C. to 85° C.

12. The power tool according to claim 1, wherein the second capacitor works within a temperature range of −40° C. to 105° C.

13. A power tool, comprising:
a power interface configured to be connected to a power supply;
a motor;
a driver circuit having a plurality of switching elements for driving the motor;
at least one capacitor configured to filter out current spikes in the power supply;
at least one capacitor switch connected to the at least one capacitor and configured to control a working state of the at least one capacitor, each of the at least one capacitor comprises a first capacitor and a second capacitor, each of the at least one capacitor switch comprises a first switch, and the first switch is connected to the first capacitor and configured to control an on or off state of the first capacitor, each of the at least one capacitor switch further comprises a second switch, the second switch is connected to the second capacitor and configured to control an on or off state of the second capacitor;
a temperature detection unit configured to detect a temperature of a related object, wherein the related object comprises a working environment in which the power tool is located and/or the at least one capacitor and/or the motor; and
a controller electrically connected to the at least one capacitor switch and configured to control an on or off state of the at least one capacitor switch,
wherein the controller is configured to:
acquire the temperature of the related object;
control the at least one capacitor switch to be in a first on or off state such that the at least one capacitor works in a first working state when the temperature is lower than a temperature threshold;
control the at least one capacitor switch to be in a second on or off state such that the at least one capacitor works in a second working state when the temperature is higher than the temperature threshold; control the first switch to be turned on such that the first capacitor is in a working state and control the second switch to be turned off such that the second capacitor is in a non-working state when the temperature is lower than the temperature threshold; and control the first switch to be turned off such that the first capacitor is in a non-working state and control the second switch to be turned on such that the second capacitor is in a working state when the temperature is higher than the temperature threshold.

14. A power tool, comprising:
a motor;
a driver circuit for driving the motor;
a capacitor configured to filter out current spikes in a power supply;
a capacitor switch connected to the capacitor and configured to control a working state of the capacitor, the capacitor comprises a first capacitor and a second capacitor, the capacitor switch comprises a first switch, and the first switch is connected to the first capacitor and configured to control an on or off state of the first capacitor, the capacitor switch further comprises a second switch, the second switch is connected to the second capacitor and configured to control an on or off state of the second capacitor;
a temperature detection unit configured to detect a temperature of a related object; and
a controller electrically connected to the capacitor switch and configured to control an on or off state of the capacitor switch;
wherein the capacitor switch comprises a third switch and a fourth switch, the third switch is connected between the power supply and the capacitor and configured to control a charging state of the capacitor, and the fourth switch is connected in parallel to the capacitor and configured to control a discharging state of the capacitor,
wherein the controller is configured to:
acquire the temperature of the related object; and
control the third switch and the fourth switch to be in complementary on or off states at a certain frequency when the temperature is lower than a temperature threshold, and
wherein the complementary on or off states refer to that the fourth switch is turned off while the third switch is turned on and that the fourth switch is turned on while the third switch is turned off.

15. The power tool according to claim 14, wherein the controller is configured to control the third switch to be turned on and the fourth switch to be turned off when the temperature is higher than the temperature threshold.

16. The power tool according to claim 14, wherein the temperature threshold is a specific temperature value or a temperature threshold range comprising a lowest temperature and a highest temperature.

17. The power tool according to claim 16, wherein the temperature threshold is the temperature threshold range comprising the lowest temperature and the highest temperature, and the controller is configured to:
control the third switch and the fourth switch to be in the complementary on or off states at the certain frequency when the temperature is lower than the lowest temperature; and
control the third switch to be turned on and the fourth switch to be turned off when the temperature is higher than the highest temperature.

* * * * *